United States Patent
Sagi et al.

(10) Patent No.: US 8,855,231 B2
(45) Date of Patent: Oct. 7, 2014

(54) METHODS AND APPARATUS FOR SIGNAL CONDITIONING FOR POLAR TRANSMITTERS

(75) Inventors: Ariel Y. Sagi, San Diego, CA (US); Jeremy M. Stein, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 13/331,206

(22) Filed: Dec. 20, 2011

(65) Prior Publication Data

US 2013/0022148 A1 Jan. 24, 2013

Related U.S. Application Data

(60) Provisional application No. 61/510,809, filed on Jul. 22, 2011.

(51) Int. Cl.
*H04K 1/02* (2006.01)
*H04L 27/36* (2006.01)

(52) U.S. Cl.
CPC .................. *H04L 27/361* (2013.01)
USPC ........... 375/296; 375/297; 375/300; 375/302; 375/308

(58) Field of Classification Search
USPC .......................... 375/296, 297, 300, 302, 308
See application file for complete search history.

(56) References Cited

U.S. PATENT DOCUMENTS

| | | | |
|---|---|---|---|
| 2003/0092405 A1 | 5/2003 | Groe et al. | |
| 2006/0234652 A1* | 10/2006 | Oka | 455/102 |
| 2008/0304077 A1* | 12/2008 | Demarest | 356/486 |
| 2009/0072921 A1 | 3/2009 | Schmid | |
| 2009/0316627 A1* | 12/2009 | Fonseka et al. | 370/328 |
| 2010/0316164 A1* | 12/2010 | Liang et al. | 375/298 |
| 2011/0116535 A1 | 5/2011 | Mori et al. | |

FOREIGN PATENT DOCUMENTS

WO 2008106364 A1 9/2008

OTHER PUBLICATIONS

International Search Report and Written Opinion—PCT/US2012/047480—ISA/EPO—Oct. 24, 2012.

* cited by examiner

*Primary Examiner* — Kabir A Timory
(74) *Attorney, Agent, or Firm* — QUALCOMM IP Department; James Hunt Yancey, Jr.

(57) ABSTRACT

Methods, systems, devices, and apparatuses for signal conditioning of polar transmitters are discussed this patent application. According to one embodiment, a frequency limiting mechanism for a polar transmitter can perform minimal distortion frequency limiting to comply with the polar transmitter requirements while meeting emissions specifications. Embodiments of the present invention may be utilized as features or components of wireless communication devices to enable minimal distortion to information carrying signals and to meet emissions specifications. Other aspects, embodiments, and features are claimed and discussed above.

20 Claims, 15 Drawing Sheets

METHODS AND APPARATUS FOR SIGNAL CONDITIONING FOR POLAR TRANSMITTERS

CROSS REFERENCE TO RELATED APPLICATION & PRIORITY CLAIM

The present application claims the benefit of and priority to U.S. Provisional Patent Application No. 61/510,809, filed 22 Jul. 2011, under 35 U.S.C. §119, which is incorporated herein by reference as if fully set forth below for all reasons.

TECHNICAL FIELD

Embodiments of the present invention generally relate to polar transmitters in wireless communication devices, and more specifically, to signal conditioning within a transmission path for limiting frequency (differential phase) and/or adjusting the Peak to Average Power Ratio (PAPR).

BACKGROUND

Polar transmitters have been utilized in mobile devices for their flexibility and performance benefits over their traditional rectangular format counterparts. Polar transmitters have been proven to be amenable to implementation in low-voltage nano-scale CMOS technology. FIG. 1 shows a conceptual block diagram of a conventional polar transmitter 100, which may include a modulator 105, a rectangular to polar converter 110, a differentiator 115, an adder 120, a voltage controlled oscillator (VCO) 125, a mixer 130, and a power amplifier 135.

The polar transmitter 100 may receive symbols as an input signal having a Cartesian representation (i.e., a complex signal with in-phase (I) and quadrature (Q) components), which may also be denoted herein as a "rectangular-form." The input signal may be converted to a polar representation (also denoted herein as a "polar-form") using the rectangular to polar converter 110. The rectangular to polar converter 110 produces two signal components, an envelope (i.e., magnitude) component and a phase component. The phase component may be converted to frequency by a digital frequency converter shown as the time differentiator 115, and then offset (i.e., up-converted) to a carrier frequency $f_c$ using the adder 120. The upconverted frequency may be used to drive the voltage controlled oscillator 125 which generates a modulated sinusoidal signal. The envelope signal from the rectangular to polar converter 110 can be multiplied by the modulated sinusoid signal to provide an input for the power amplifier 135. The power amplifier 135 may amplify this signal for transmission through an antenna (not shown).

Traditionally, polar transmitters have been successfully used in devices utilizing narrowband modulation standards, such as the 2G cellular or EDGE standard. However, polar transmitters face challenges when used in standards based on wideband modulation techniques, such as 3G (e.g., WCDMA), 4G (e.g., 3GPP LTE, WiMAX), and the like. The non-linear polar to rectangular transformation may result in much larger dynamic range and signal bandwidths as the complex signal trajectory approaches or crosses the constellation origin in the I-Q plane.

A representation of the I/Q plane 200 is provided in the diagram shown in FIG. 2, where two separate signal trajectories 205, 210 are shown. Each signal trajectory may represent a locus of samples provided by the modulator 105 over some period of time. It can be seen that in signal trajectory 205, the differential phase $\Delta\theta 1$ is larger than the differential phase $\Delta\theta 2$ corresponding to signal trajectory 210, because signal trajectory 210 is further displaced from the origin. The large differential phase values may result in high sample-to-sample frequencies that may exceed the linear region of the VCOs used in the polar transmitter 100, which may cause unacceptable distortions in the transmitted signal.

Also, the envelope component output from the rectangular to polar converter 110 may exhibit large peaks, thus having a large Peak to Average Power Ratio (PAPR). Signals having a large PAPR may also present difficulties for power amplifiers, as such peaks may drive the amplifiers into non-linear operation, or may event result in saturation such as clipping.

Conventional approaches for meeting the aforementioned challenges may include a "hole punching" solution for reducing the amplitude and phase bandwidths. Such techniques may alter the signal trajectory such that it avoids a defined proximity about the constellation origin. However, these conventional techniques may introduce a variety of non-linear distortions in the polar transmitter's signal path and/or introduce other distortions that can increase the Error Vector Magnitude (EVM) of the amplified signal.

BRIEF SUMMARY OF SOME EXEMPLARY EMBODIMENTS

Exemplary embodiments of the invention are directed to systems and methods for signal conditioning in polar transmitters which can overcome the aforementioned and other challenges. Indeed, embodiments of the present invention can provide several technical advantageous features, including, some or all of the following. Embodiments of the invention can be suited for hardware implementation for minimal distortion frequency limiting. Features can also include an internal frequency limiting mechanism via a relaxed constraints LPF design. Features may also include a spill filter to aid in frequency limiting. A spill filter can ensure that the frequency is limited in extreme cases. The spill filter can acts as a phase locked limiter, which limits the frequency input. Yet an additional advantage is embodiments of the invention can serve as a dual-purpose mechanism that performs (i) frequency limiting and also (ii) peak to average power ratio reduction. Several exemplary embodiments that may implement one or more of the above-discussed features are previewed below.

In some embodiments, the present invention can include a method for conditioning a signal in a polar transmitter. The method can comprise one or more of the following features: receiving an input signal having a rectangular form; determining whether to limit differential phase and/or adjust the Peak to Average Power Ratio (PAPR) of the input signal; converting the input signal having the rectangular form to an input signal having a polar form; limiting a differential phase of the input signal having the polar form to generate a modified signal having a polar form, and/or adjusting the peak to average power ratio, based on the determining; converting the modified signal having the polar form to a modified signal having a rectangular form; determining a residual signal based at least in part on the input signal having the rectangular form and the modified signal having a rectangular form; filtering the residual signal to reduce high-frequency components to obtain a filtered signal; and adding the filtered signal to the input signal having the rectangular form to produce an output signal with a limited differential phase and/or reduced PAPR.

Embodiments of the present invention can also be implemented in varying apparatuses or devices. For example, an apparatus can comprise a processor configured to do at least one of and all of the following: receive an input signal having a rectangular form; determine whether to limit differential phase and/or adjust the Peak to Average Power Ratio (PAPR) of the input signal; convert the input signal having the rectangular form to an input signal having a polar form; limit a differential phase of the input signal having the polar form to generate a modified signal having a polar form, and/or adjusting the peak to average power ratio, based on the determining; convert the modified signal having the polar form to a modified signal having a rectangular form; determine residual signal based at least in part on the input signal having the rectangular form and the modified signal having the rectangular form; filter the residual signal to reduce high-frequency components; and adding the filtered signal from the received signal having the rectangular form to produce an output signal with a limited differential phase and/or reduced PAPR.

Embodiments of the present invention can also include a polar transmitter for use with a wireless communication device comprising. A polar transmitter can include a processor to convert data for transmission from a rectangular form to a polar form; a processor to convert the polar form to a modified polar form based on at least one of frequency (differential phase), and peak to average power ratio processing; a processor to generate a modified rectangular form based on the modified polar form; a processor to produce a limited differential phase output based on the rectangular form and the modified rectangular form. Also, a wireless communication system that includes one or more communication devices configured to communicate wirelessly can include a wireless communication device that comprises a transmitter or a transceiver utilizing filtering features as discussed in this application.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

The accompanying drawings are presented to aid in the description of embodiments of the invention and are provided solely for illustration of the embodiments and not limitation.

DETAILED DESCRIPTION OF SOME EXEMPLARY EMBODIMENTS

Figure 1:
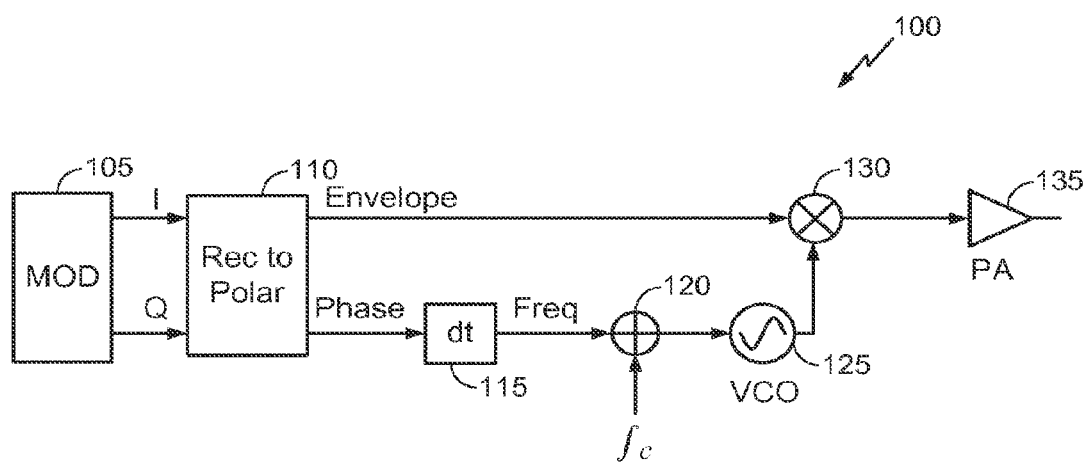
FIG. 1 is a conceptual block diagram depicting an exemplary conventional polar transmitter.
Figure 2:
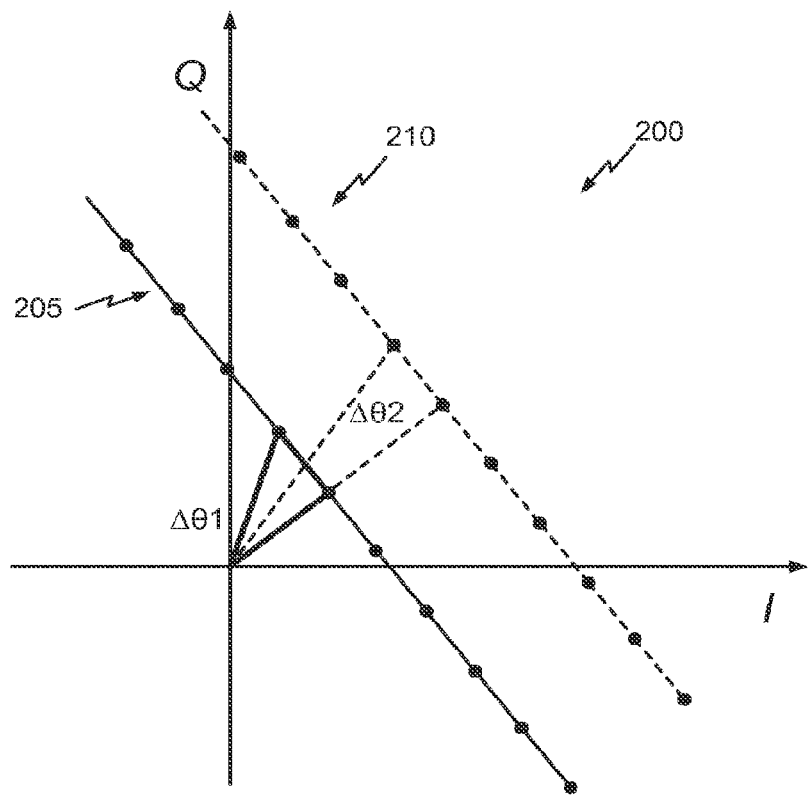
FIG. 2 is a diagram that depicts a representation of the I/Q plane having two separate signal trajectories.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

Because the differential phase of a signal is proportional to the frequency of the signal, the term differential phase and frequency may be used interchangeably herein.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Some embodiments may be described in terms of sequences of actions to be performed by, for example, elements of a computing device. Various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Embodiments of the invention are guided by developing an analytical formulation in order to find techniques which limit differential phase, and also mitigate distortions to the information carrying signal for both the phase and envelope components. As used herein, the term "limit" or "limiting" differential phase may be associated with a variety of "optimization" algorithms which have been formulated to focus on reducing the differential phase while maintaining signal integrity according to prescribed restraints and/or conditions, which will be discussed below. While the results of the optimization algorithms may be interpreted as reducing differential phase according to various constraints, these results should not be narrowly interpreted as producing the absolute minimum values obtainable. Moreover, "sub-optimal" techniques are also described herein which may produce results that are almost as good as the optimal techniques, and may be more computationally efficient.

To develop an analytical foundation for limiting differential phase and/or improving an envelope of a signal, an optimization approach called the Karush-Kuhn-Tucker (KKT) conditions may be used to derive explicit solutions. The KKT conditions may determine a set of optimal phase and envelope values over a fixed correction length having a prescribed number of samples N (e.g., N=4). The KKT approach generalizes the method of Lagrange multipliers by permitting optimization with inequality constraints. The KKT optimization process minimizes objective function:

$$\operatorname{argmin}_{\hat{r}_k, \hat{\theta}_k} D = \sum_{k \in K} |\hat{r}_k e^{j\hat{\theta}_k} - r_k e^{j\theta_k}|^2$$

under the following constraints:

$$\forall k, (\hat{\theta}_k - \hat{\theta}_{k-1}) \le \omega_T$$

where
$(r_k, \theta_k)$ is a sample of the input signal in polar form,
$(\hat{r}_k, \hat{\theta}_k)$ is a sample of a modified signal in polar form,
k is the sample index of each signal, and
$\omega_T$ is a differential phase threshold value.

While the KKT approach provides explicit solutions from limiting differential phase, it is a computationally demanding algorithm which may not be suitable for implementation in mobile wireless devices. Accordingly, several alternative approaches are described below. These approaches may reduce the complexity of the solution, and provide techniques more suitable for implementation on mobile wireless devices. Yet, however, in some embodiments, the KKT approach may be desired or utilized.

Figure 3:
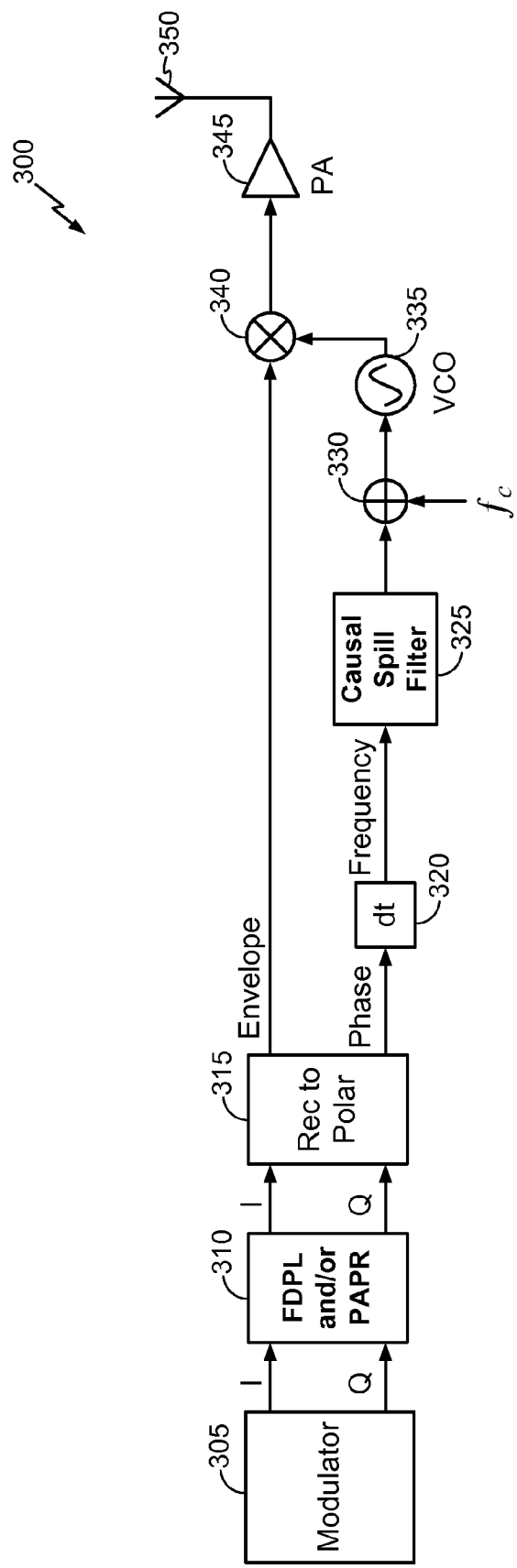
FIG. 3 is a conceptual block diagram showing an exemplary transmit path which utilizes Filtered Differential Phase Limiting (FDPL), to reduce differential phase, and/or Peak to Average Ratio (PAPR) adjustment to adjust the dynamic range according to some embodiments of the present invention.

FIG. 3 is a conceptual block diagram showing a transmit path 300. The transmit path 300 can utilize Filtered Differential Phase Limiting (FDPL) to limit differential phase and/or Peak to Average Power Ratio (PAPR) adjustment to reduce dynamic range. The FDPL algorithms, described in more detail below, may employ other solutions which include simplifications for the KKT solutions. The transmit path 300 may include a modulator 305, a FPDL and/or PAPR module 310, a rectangular to polar converter 315, a differentiator 320 a Causal Spill Filter (CSF) 325, an adder 330, a VCO 335, a mixer 340, a power amplifier 345, and an antenna 350.

The modulator 305 may provide symbols represented by I and Q samples in rectangular form. The modulator 305 may use, for example, any form of QAM modulation (e.g, 32QAM configuration) and/or M-ary PSK. The modulator 305 may provide the I and Q samples to the FPDL and/or PAPR module 310 to limit differential phase and/or adjust PAPR in the signal. A number of FPDL techniques may be implemented, such as, for example, a Rotated and Scaled Filter (RSF) and/or a Viterbi based approach, which are described in more detail in the following sections.

The FPDL and/or PAPR module 310 may then provide the frequency limited and/or reduced PAPR I/Q samples to the rectangular to polar converter 315 to convert the frequency limited signal to polar form. The rectangular to polar converter 315 may utilize, for example, a Coordinate Rotation Digital Computer (CORDIC) algorithm to efficiently perform the conversion, which produces an envelope value ($r_k$) and a phase ($\theta_k$) value. The phase value may be differentiated by the differentiator module 320 to produce frequency.

The frequency values may then be provided to a Causal Spill Filter (CSF) 325. The CSF 325 can limit any large frequencies that may have been introduced by the FPDL and/or PAPR module 310. Details regarding the CSF 325 and its implementation are discussed below. The frequency values may then be offset (e.g., up-converted) to a carrier frequency $f_c$ using the adder 330. An up-converted frequency may be used to drive the VCO 335 to generate a modulated sinusoidal signal. The modulated sinusoidal signal may be provided to the mixer 340, where the envelope signal, from the rectangular to polar converter 315, can be multiplied by the modulated sinusoid signal to provide an input for the power amplifier 345. The power amplifier 345 amplifies the transmit signal for transmission through an antenna 350.

Figure 4:
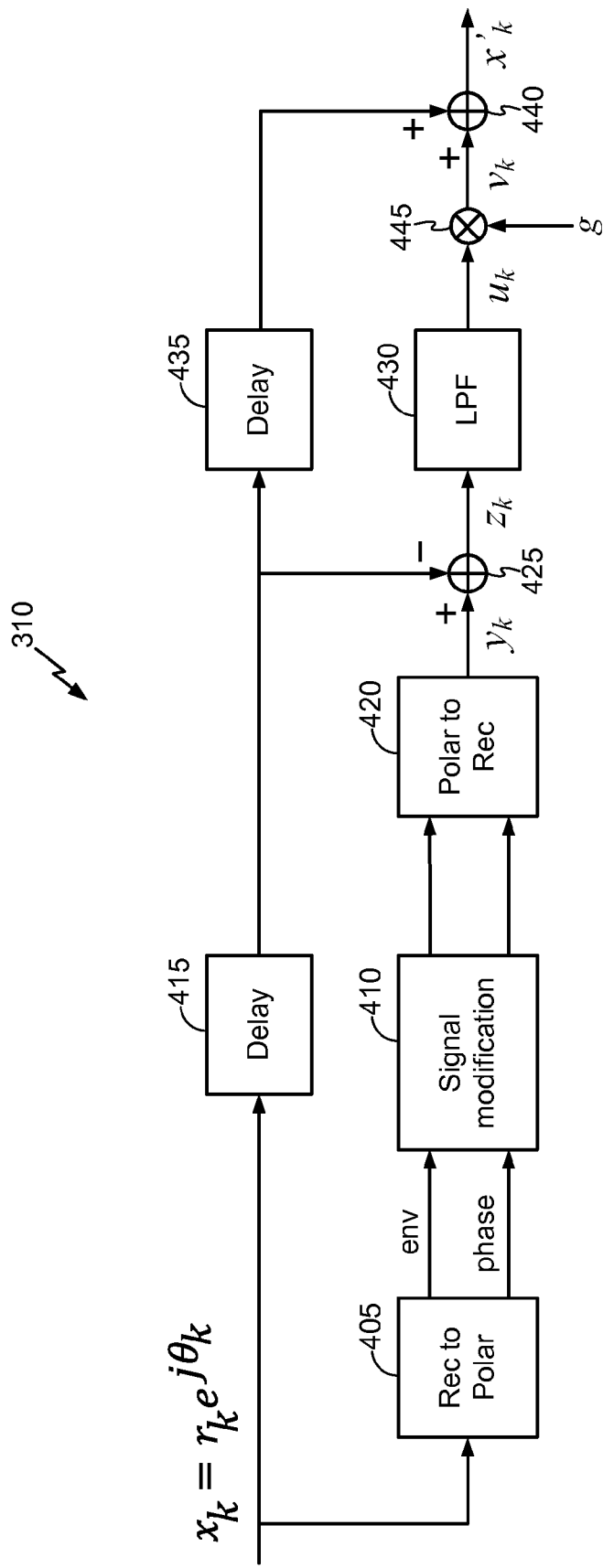
FIG. 4 is a conceptual block diagram showing more details of an exemplary FDPL and/or PAPR module according to some embodiments of the present invention.

FIG. 4 is a detailed conceptual block diagram of an exemplary FDPL and/or PAPR module 310. The FPDL and/or PAPR module 310 may include a Rectangular-to-Polar converter 405, a first delay module 415, a signal modification module 410, a Polar-to-Rectangular converter 420, a first adder 425, a second delay module 435, a filter 430 (e.g., a low pass filter 430), a second adder 440, and a multiplier 445.

The FPDL and/or PAPR module 310 initially may receive an input signal in rectangular format ($x_k$) from the modulator 305 (not shown). In the lower branch, the input signal ($x_k$) may be provided to the Rectangular-to-Polar module 405 to convert the input signal to polar form ($r_k, \theta_k$). The input signal ($r_k, \theta_k$) may then be provided to signal modification module 410. The signal modification module 410 may limit the differential phase (frequency) and/or adjust the Peak to Average Power ratio to reduce dynamic range. As will be noted below, the signal modification module 410 may perform either one of the operations, or both, depending upon how the signal modification module 410 is configured. For example, the configuration stems from the requirements due to limitations in RF chip and/or PA, and can be based on analytical analysis and signal measurements.

The signal modification module 410 can produce a modified signal in polar form ($\hat{r}_k, \hat{\theta}_k$), which may be converted to rectangular form ($y_k$) by Polar-to-Rectangular 420. An error signal ($z_k$) may be computed by subtracting a delayed version of the input signal, provided by the first delay element 415, from the modified signal in rectangular format (i.e., $z_k = y_k - x_k$). Because the error signal ($z_k$) may be wideband, it may be filtered to comply with RF emissions requirements (e.g., spectral mask and transients requirements) by low pass filter 430. The low pass filter 430 produces the filtered error signal ($u_k$).

The filtered error signal ($u_k$) may then have its gain modified according to a PAPR adjustment algorithm which may also be calculated by the signal modification module 410. The gain modification may be implemented by multiplier 445. The multiplier 445 can scale the filtered error signal ($u_k$) by a amplitude adjustment value g, to produce an output error signal ($v_k$). The amplitude adjustment value g may be set to unity when the signal modification module 410 only performs FPDL processing.

A second delay 435 can provide another delayed version of the input signal ($x_k$). The second delay may be provided to second adder 440 along with the output error signal ($v_k$). The second adder 440 thus produces the output signal ($x'_k$), having limited differential phase and/or adjusted amplitude.

The filter 430 illustrated in FIG. 4 can have varying aspects as desired. For example, in some embodiments, the filter 430 may be a low pass filter, a high pass filter, or a band pass filter. Also, the filter 430 need not be a matched filter as may be used in conventional approaches, which can be a few symbols long due to the strict requirements on the pass/transition/stop bands. Because the error signal ($z_k$) can be wideband and may be noise-like and of low power, a simpler filter having relaxed constraints may be used to produce good results. For example, the low pass filter 430 may be a boxcar filter or a Kaiser filter. The length of a utilized boxcar filter may be chosen so that so that the filter nulls may be placed in the vicinity of specific frequencies having maximal power levels that are limited by the emissions requirements associated with a wireless network.

In some embodiments, however, the boxcar filter nulls may not be placed exactly at specific frequencies since the nulls are in multiples of the ratio of the sampling frequency to the window length. A Kaiser filter may address this issue as a main lobe width of the Kaiser filter can be controlled. This can enable placement of the first null at one of the desired specific frequencies. This may allow for a small improvement in the reduction of transient emissions. A box car filter may also be implemented in a highly efficient manner using a cascaded integrator and a comb filter.

The signal modification module 410 may utilize a variety of computationally efficient techniques for limiting differential phase, such as, for example, the Rotated and Scaled Filter (RSF) and the Viterbi-based approach, both of which are described in more detail below in the description of FIGS. 6-8 and 9, respectively. Afterwards, details of the PAPR algorithm which may be implemented in signal modification module 410 are also presented. In addition, and as mentioned above, embodiment of the present invention can utilize the above-discussed KKT approach being implemented in the signal modification module 410, for example.

Filtered Differential Phase Limiting

Figure 5:
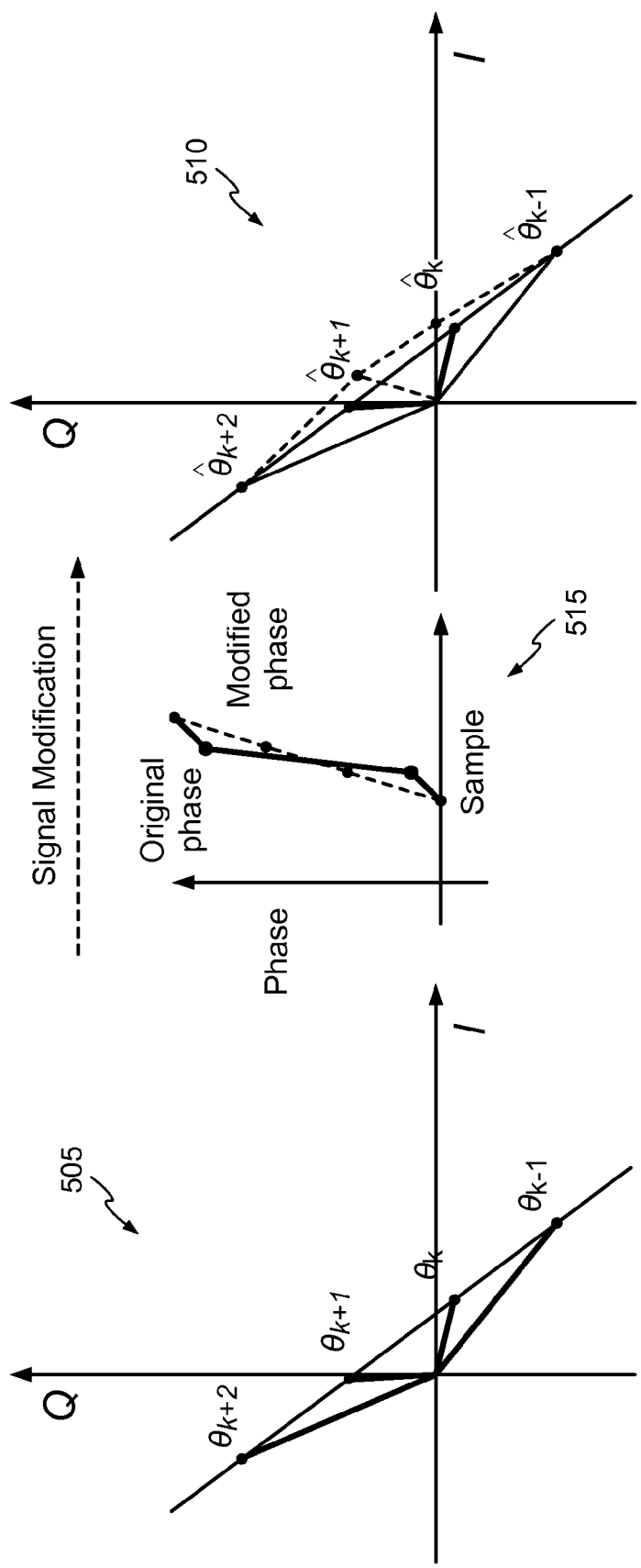
FIG. 5 is shows a number of graphs illustrating how the FDPL technique modifies an exemplary signal trajectory according to some embodiments of the present invention.

FIG. 5 illustrates a number of graphs illustrating examples of how the FDPL and/or PAPR module 310 can modify a signal trajectory. In the I-Q plane 505 shown on the left, the input signal trajectory passes close to the origin. Thus, the sample-to-sample differential phase values $\Delta\theta_k$ between phase values $\theta_k$ (k=2, 1, 0, −1) are large.

The smaller graph 515 shows a plot of original phase values $\theta_k$ and modified phase values $\hat{\theta}_k$ versus a sample index. As can be seen in graph 515, the modified phase curve $\hat{\theta}_k$ can vary less from sample to sample than the original phase values $\theta_k$, and thus appears to be "better behaved." In this example, the modified phase curve $\hat{\theta}_k$ appears to be linear in graph 515; however, it may typically have a non-linear structure which is more slowly varying than the original phase values. The I-Q plane 510 shown on the right illustrates a modified signal trajectory corresponding to modified phase $\hat{\theta}_k$ (k=2, 1, 0, −1). The modified signal trajectory is gently pushed away from the origin in a manner which reduces the sample-to-sample differential phase values $\Delta\hat{\theta}_k$, while limiting the distortions to the signal trajectory.

The results of FIG. 5 and discussed herein are merely an illustration. Indeed, the FPDL techniques discussed in this application or implemented in embodiments of the present invention may differ from this illustration. Two FPDL techniques, the Rotated Scaled Filter (RSF) and the Viterbi method, are presented in more detail below.

Figure 6:
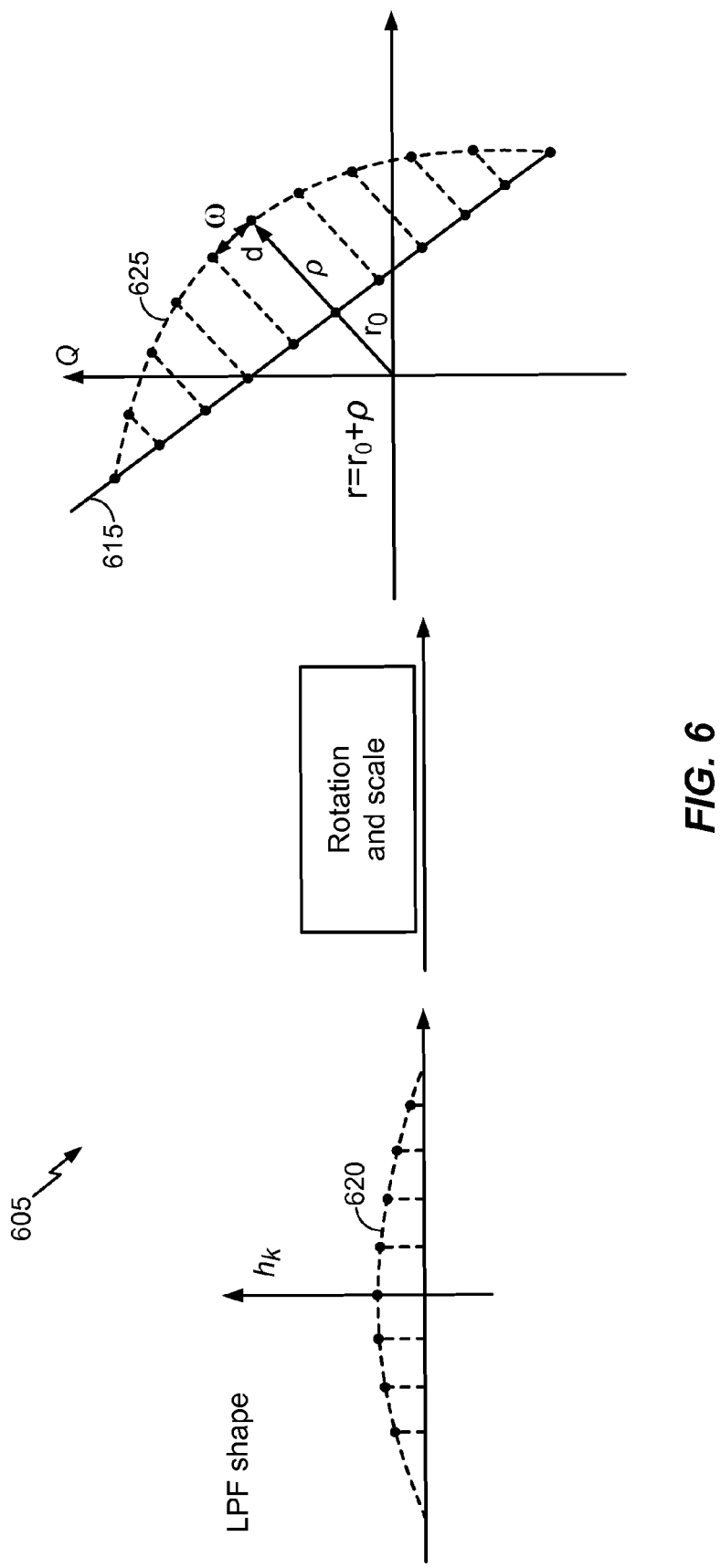
FIG. 6 is a simplified diagram illustrating an exemplary rotated scaled filter (RSF) which may be used for FDPL according to some embodiments of the present invention.

FIG. 6 is a diagram illustrating an exemplary rotated scaled filter (RSF). The RSF may be used in the signal modification module 410. The RSF is a direct approach for limiting differential phase and spectral emissions by using a linear filter which has been displaced and rotated appropriately. In diagram 605 on the left, an exemplary prototype filter 620 is shown having coefficients $h_k$. A displacement vector may be computed which can be used to rotate and scale the filter 620. The rotated and scaled filter may be added to the input signal trajectory 615, at a selected location where it is proximate to the origin of the IQ plane, to produce a modified signal trajectory 625.

The modified signal 625 may be given by:

$$x'_k = x_k + \sum_l p_l \delta_{k-\kappa_l} * h_k$$

where l denotes the correction index, $p_l$ denotes the displacement vector for each correction, $\delta_{k-\kappa_l}$ is Kronecker's delta function centered to the sample $\kappa_l$ and $h_k$ is the shaping filter (LPF) impulse response.

The error signal $\sum p_l \delta_{k-\kappa_l} * h_k$ is by definition colored according to the shape of filter 620. Therefore, the error signal can be shaped according to spectral mask requirements by using an appropriately designed filter.

The purpose of the displacement vector $p_l$ is to rotate and scale the shaping filter impulse response in such a way that will reduce the differential phase to an appropriate range. The displacement vector $p_l$ can be written in polar form as:

$$p_l = \rho_l e^{j\psi_l}$$

The amplitude $\rho_l$ and phase $\psi_l$ are determined according to the differential phase limit. It is apparent that the amplitude $\rho_l$ should be minimal in order to reduce Error Vector Magnitude (EVM) and sprectral emissions, as will be shown in more detail below.

As can be seen in FIG. 6, the difference between the modified signal trajectory 625 and the input signal trajectory 615 is the rotated and scaled filter. The tangent function of the differential phase ω can be approximated as:

$$\frac{d}{r} = \frac{d}{(r_0 + \rho)} \cong \tan(\omega)$$

From the above relationship, it is clear that increasing the scale factor ρ will result in reduced differential phase ω and increased EVM.

Figure 7A:
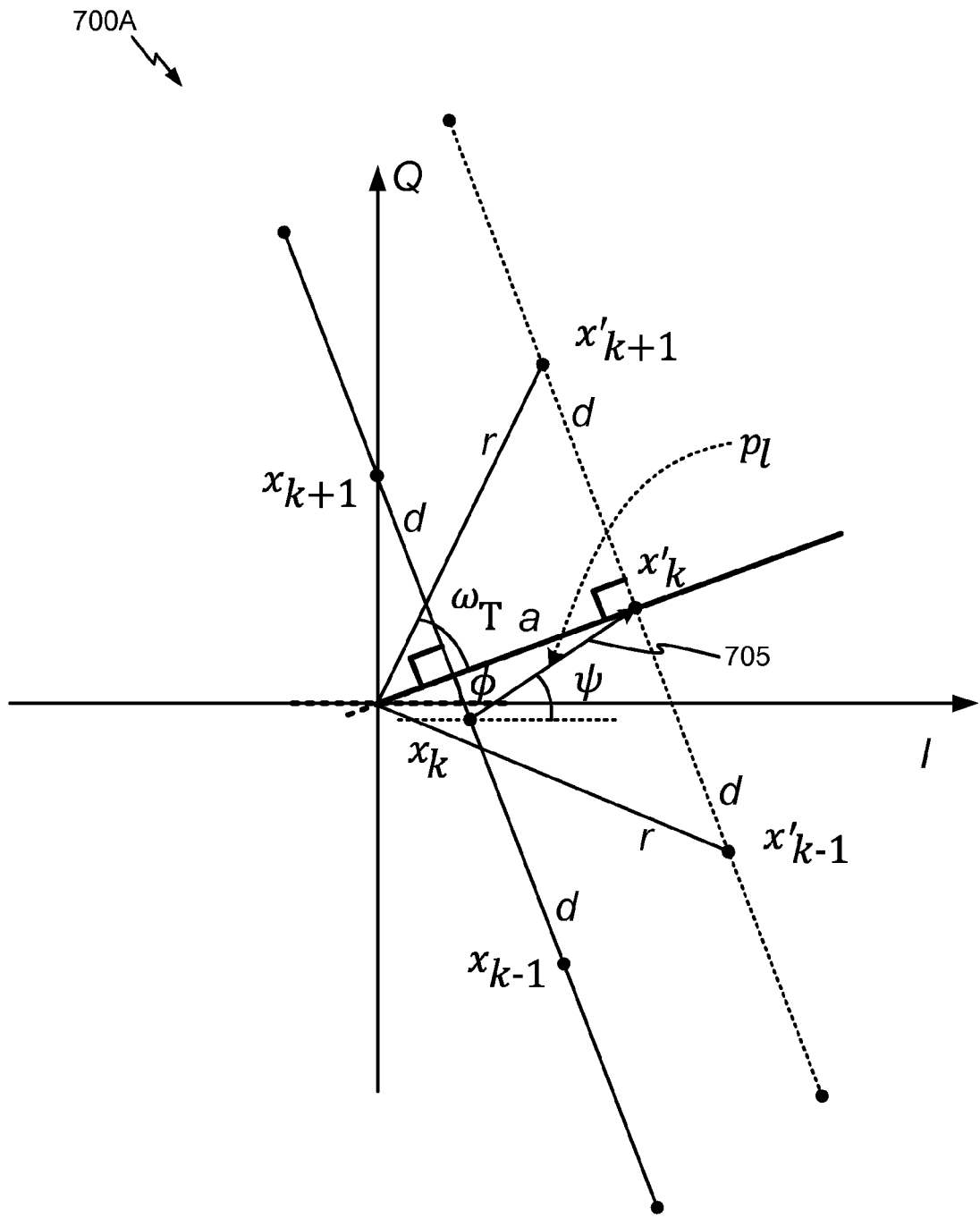
FIGS. 7A and 7B show geometric diagrams illustrating an embodiment for computing a displacement vector used in the RSF embodiment according to some embodiments of the present invention.
Figure 7B:
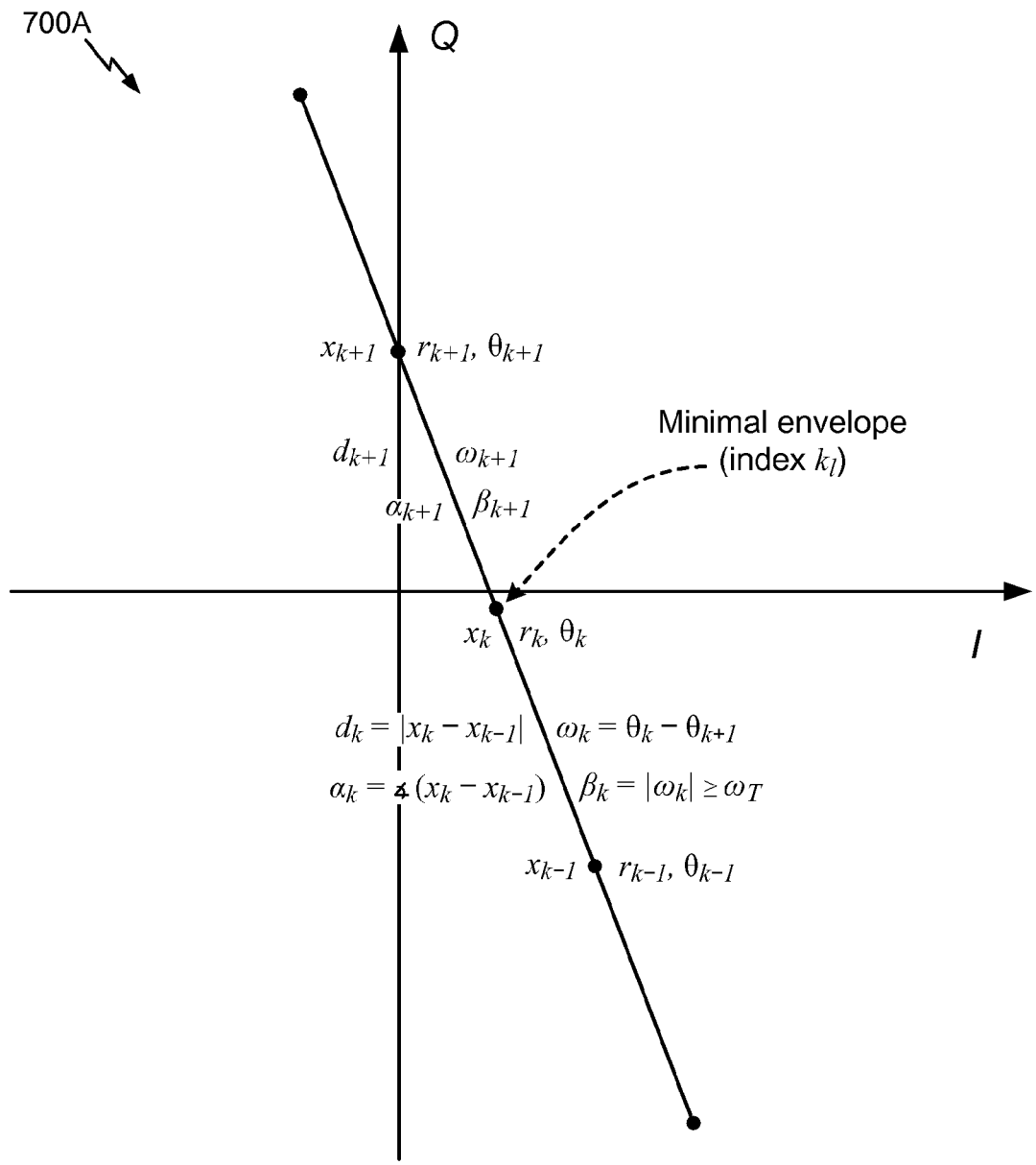

FIGS. 7A and 7B show geometric diagrams illustrating an embodiment for computing a displacement vector which forms an equal differential phase on either point where the RSF is centered (hereinafter termed the "equal phase forming rotation and scale" method).

This embodiment may be based on the following approximations. While the below embodiment uses the approximations for simplification and complexity reduction, the RSF can be adapted to remove the approximations on the expense of added complexity.

1. The three center filter coefficients are assumed identical, and therefore it is assumed that the samples ($x_{k-1}$, $x_k$, $x_{k+1}$) are modified in the same way. In practice, since the three center filter coefficients are not identical, the samples modifications are not identical; and
2. The distance between $x_{k-1}$ and $x_k$ is assumed identical to the distance between $x_k$ and $x_{k+1}$. In practice the distances are not identical.

FIG. 7A shows variables that are used for displacement vector computation. The input signal trajectory is shown by a solid black line connecting the samples ( . . . , $x_{k-1}$, $x_k$, $x_{k+1}$, . . . ). In FIG. 7A and the ensuing explanation the center of correction is assumed to be $x_k$. The modified signal trajectory is shown in dotted black line connecting the samples ( . . . , $x'_{k-1}$, $x'_k$, $x'_{k+1}$, . . . ). Where the value $x'_k$ may be thought of as an "equal-phase sample location." The displacement vector 705 is defined from $x_k$ to $x'_k$. The distance between $x_{k-1}$ and $x_k$ is denoted by d, and is assumed to be identical to the distance between $x_k$ and $x_{k+1}$. The displacement is designed to form an isosceles triangle with vertexes at the origin, $x_{k-1}$, and $x'_{k+1}$. The angles that are formed (1) between and $x'_{k-1}$ and $x'_k$ and (2) between $x'_k$ and $x'_{k+1}$ are equal and denoted by ω. The angle (differential phase) ω is equal to the differential phase limit $\omega_T$.

The following steps generally comprise the "equal phase forming rotation and scale" method:
1. (offline processing) Compute the constant $c_0 = \cot(\omega_T) = \cos(\omega_T)/\sin(\omega_T)$. The differential phase threshold is given by $$\omega_T = \frac{f_T}{f_s} 2\pi,$$

where $f_T$ is the frequency threshold and $f_s$ is the sample rate.
2. (offline processing) Normalize the filter coefficients such that the max/largest coefficient is equal to one, i.e.,:

$$h_k = \frac{\hat{h}_k}{\max(\hat{h})}$$

where the prototype filter is $\hat{h}$.

3. Identify the locations where the absolute value of the differential phase $|\omega_k| = |\theta_k - \theta_{k-1}|$ is above the differential phase threshold $\omega_T$. Set the correction center $k_l$ as the sample with the minimal envelope between the consecutive samples that are above the differential phase limit. The indicator $\beta_k = |\omega_k| \geq \omega_T$ is used to indicate that samples are above the differential phase limit.
4. Calculate the length $\hat{d}$ as:

$$\hat{d} = \max\{d_{k_l} = |x_{k_l} - x_{k_l-1}|, d_{k_l+1} = |x_{k_l+1} - x_{k_l}|\}$$

5. Calculate the length a as:

$$a = c_0 \hat{d}$$

6. Calculate the gradient angle in the vicinity of the origin as (dependent on step (4)):

$$\hat{\alpha} = \begin{cases} \alpha_{k_l} = \measuredangle(x_{k_l} - x_{k_l-1}), & \text{if } \hat{d} = d_{k_l} = |x_{k_l} - x_{k_l-1}| \\ \alpha_{k_l+1} = \measuredangle(x_{k_l+1} - x_{k_l}), & \text{if } \hat{d} = d_{k_l+1} = |x_{k_l+1} - x_{k_l}| \end{cases}$$

7. Choose φ as one of the angles $$\left\{\hat{\alpha} + \frac{\pi}{2}, \hat{\alpha} - \frac{\pi}{2}\right\}$$

that is the closest to $\theta_k$.
8. Calculate the modified position $x'_{k_l}$ as:

$$x'_{k_l} = ae^{j\phi}$$

9. Calculate the displacement vector from $x_{k_l}$ to $x'_{k_l}$ as:

$$p_l = x'_{k_l} - x_{k_l}$$

10. Multiply each filter coefficient by the displacement vector (rotate and scale) and add the rotated and scaled filter to original signal:

$$x'_k = x_k + \sum_l p_l \delta_{k-\kappa_l} * h_k.$$

With respect to the conceptual block diagram of shown in FIG. 4, the RSF approach may be implemented in such a way that signal modification module 410 may generate the rotating and scaling vector ($p_l$), such that after Polar to Rectangular conversion module 420 and adder 425, the error signal ($z_k$), which is input to the LPF 430, may be expressed as $z_k = \Sigma_l p_l \delta_{k-k_l}$. The convolution of the error signal ($z_k$) with the filter coefficients $h_k$, and addition with the original signal $x_k$, may be performed in LPF module 430 and/or adder 440.

FIG. 7B illustrates a number of variables introduced above. For each sample $x_k$ the polar components $r_k$, $\theta_k$ are computed. For each segment connecting $x_{k-1}$ and $x_k$ the variables $\omega_k$, $\beta_k$, $d_k$, $\alpha_k$ are computed. The minimal envelope position $k_l$ is also shown in FIG. 7B.

Advantages of the RSF embodiment may include:
1. The differential phase is controlled directly in the RSF approach, so the differential phase is forced to be below the set limit.
2. The spectral emissions can be shaped according to requirements by an appropriately designed filter.
3. The required hardware for the RSF approach is similar to other approaches which may be used to limit differential phase.

Figure 8:
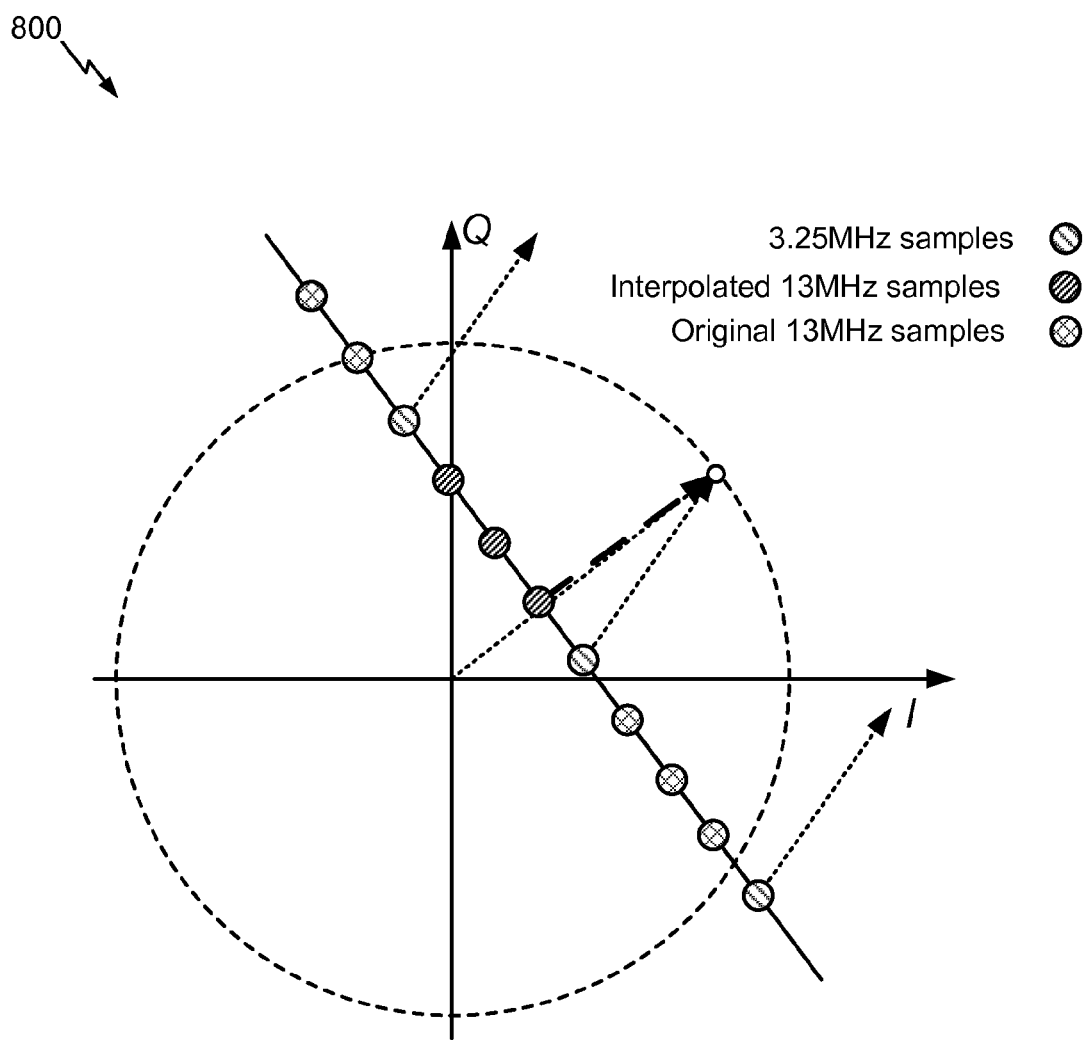
FIG. 8 is a diagram illustrating an embodiment for reducing the complexity of the RSF method for limiting differential phase according to some embodiments of the present invention.

FIG. 8 is a diagram illustrating an embodiment for reducing the complexity of the RSF method for minimizing differential phase. The RSF embodiment discussed above can utilize a signal sample rate of $f_s$, whereas the reduced complexity scheme may be implemented using a reduced sample rate of $f_s/N$, where N is an integer N>1. For example, in one embodiment, $f_s$=13 MHz and $f_s/N$=3.25 MHz.

An approach may utilize the above-discussed RSF method, working in sample rate $f_s$, and directly modify this method to work in $f_s/N$. While this direct sample rate reduction results in reduced complexity, it may also lead to reduced performance due to reduced accuracy in the lower sample rate. This approach can also be modified to improve the accuracy by locally (in the vicinity of high differential phase instance) interpolating the input signal to $f_s$ using the following steps:

1. Up-sampling to $f_s$ (e.g., $f_s$=13 MHz) using linear interpolation between two selected $f_s/N$ samples (e.g., $f_s/N$=3.25 MHz). Unlike normal interpolation, here the interpolation is performed only between two f/N samples, which are the closest to zero.
2. Identifying the interpolated $f_s$ sample closest to the required equal-phase sample location.
3. Computation of the rotating and scaling vector, and all the following steps are identical to the embodiment described above.

Figure 9:
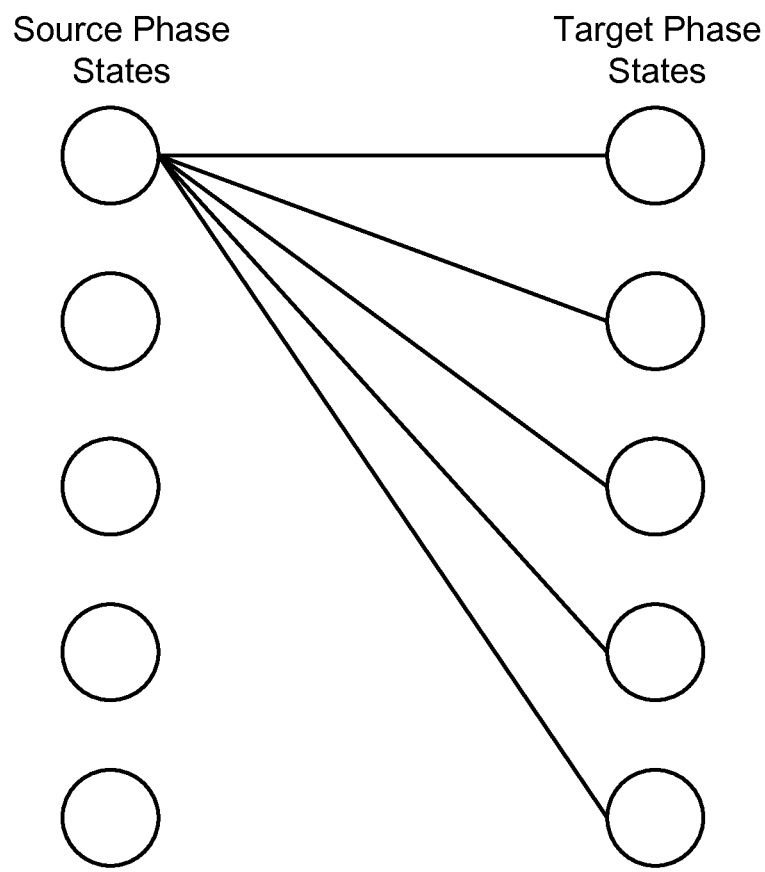
FIG. 9 illustrates another embodiment for limiting differential phase by using a Viterbi-based approach for FDPL according to some embodiments of the present invention.

FIG. 9 illustrates another embodiment for minimizing differential phase by using a Viterbi-based approach in the signal modification module 410. Minimization of the differential phase can be solved implicitly using Viterbi algorithm. The minimization using Viterbi algorithm can result in optimally modified phase and envelope signals.

Initially, a trellis may be built for each correction section. The trellis states may be composed of phase hypothesis. The start and end phase states of the trellis are the start and end phases of the correction section, respectively. For each sample in a correction section the phase states are composed of the original phase and a vector of additional phase hypothesis.

The transition metrics may be computed as follows. If the phase difference between the source phase state (in the current sample) and the target phase state (in the next sample) is greater than the phase limit value—the transition metric is set to infinite. If the phase difference is below the phase limit then the transition metric is set as $d_k=|\hat{r}_k e^{j\hat{\theta}_k} - r_k e^{j\theta_k}|^2$ after assigning an optimal envelope (given modified phase) that is computed by $$\hat{r}_k = r_k \cos(\hat{\theta}_k - \theta_k).$$

All other details (trace back, etc.) follow the known Viterbi algorithm implementation.

The Viterbi-based method can operate continuously on all samples even in sections were no correction is needed. In sections were no correction is needed, the optimal path should result in the original phase vector (since the phase states in each sample are composed of the original phase and a vector of additional phase hypothesis the original phases can be part of the optimal path).

Peak to Average Power Reduction

As noted above, FPDL and/or the PAPR module 310 may also implement a PAPR algorithm to adjust a signal's dynamic range. A PAPR algorithm may also be implemented in the Signal Modification module 410, either in conjunction with FDPL processing, or by itself. When the input signal is in polar form, the PAPR method can reduce variations in the envelope component of the polar-format signal to adjust the Peak-to-Average Power Ratio (PAPR), so that the power amplifier 345 in the polar transmitter is not driven into non-linear operation. In one embodiment, the envelope may be adjusted by clipping the amplitude when it exceeds a pre-defined threshold. The threshold can be computed according to RF spec. For example, if RF asks for x PAPR, then in transmitter simulation the threshold can be easily computed from measured average power value. Referring back to FIG. 4, the adjustment of the gain may be performed after the signal is filtered by LPF module 430. Specifically, the gain adjustment can be accomplished by multiplying the filtered error signal ($u_k$) by a factor g using multiplier 445, to produce gain adjusted signal $v_k$. The gain adjusted signal $v_k$ may be summed by adder 440 to a delayed version of the input signal to produce the amplitude adjusted signal $x'_k$.

Causal Spill Filter

Figure 10:
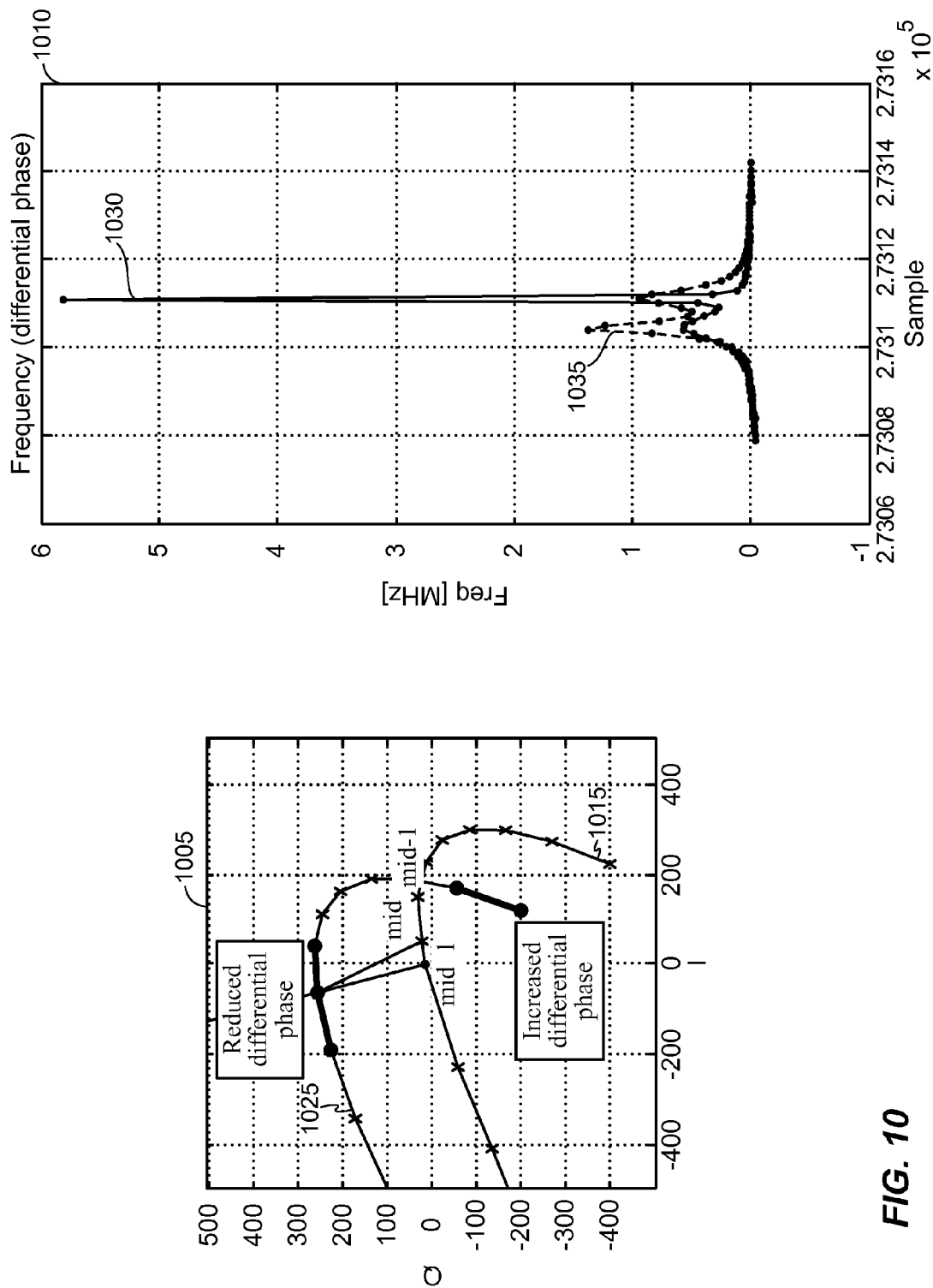
FIG. 10 shows two graphs illustrating conditions where the differential phase may actually increase after being processed by the FPDL algorithm according to some embodiments of the present invention.

FIG. 10 shows two graphs illustrating conditions where the differential phase may actually increase after being processed by the Filtered Differential Phase Limiting (FPDL) module and/or Peak to Average Power Ratio (PAPR) 310. As can be seen in the I/Q graph 1005, for the modified signal trajectory 1025, near 6 MHz the differential phase is reduced to approximately 0.95 MHz (as expected) by the FPDL and/or PAPR module 310, but at the same time causing an increase of differential phase in another part of the modified signal 1025. The differential phase (frequency) corresponding to the input signal 1030 and the modified signal 1035 is shown in graph 1010, where it can be seen that the frequency in the modified signal 1035 has been significantly increased. In this instance, a "spill filter" may be implemented to act as a phase locked limiter. The spill filter acts to "spill" differential phase values exceeding a limit over adjacent samples. A causal spill filter only alters samples occurring after the phase sample exceeding the limit.

Figure 11:
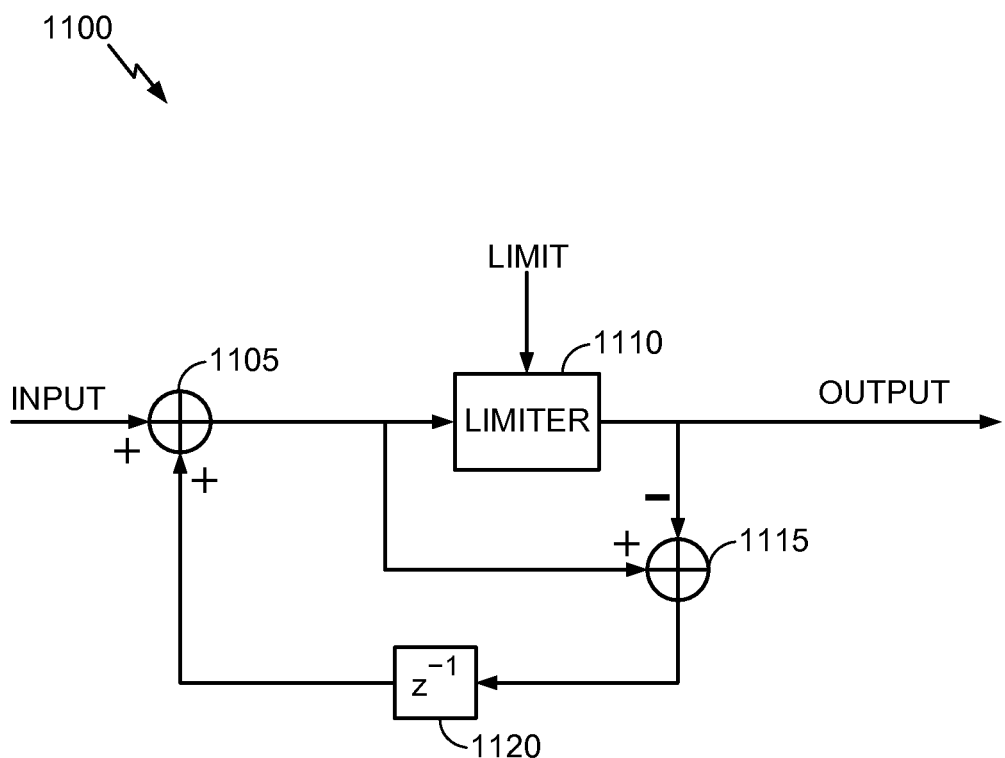
FIG. 11 is a block diagram of an exemplary embodiment Causal Spill Filter (CSF) according to some embodiments of the present invention.

FIG. 11 is a block diagram of an exemplary Causal Spill Filter (CSF) 1100. The spill filter 1100 may be placed after FPDL and/or PAPR module 310, and may further operate on the differential phase component of the signal. In one embodiment, the CSF 1100 may include a first adder 1105, a limiter 1110, a second adder 1115, and a delay element 1120. The input to the CSF 1100 may be the frequency of the modified signal produced by differentiator 320. The input added to a delayed difference signal produced by first adder 1105 and delay element 1120. This difference signal is limited by limiter 1110 based upon a limit frequency. The limit frequency may be selected, for example, based upon the distribution of the differential phase at the input of the CSF. Part of the distribution may be slightly above (e.g., 5% above differential phase limit) the differential phase threshold value. The limited signal is then subtracted from the difference signal using second adder 1115. The subtracted signal is delayed by delay element 1120 and fed back to be added to the input signal using first adder 1105.

Figure 12:
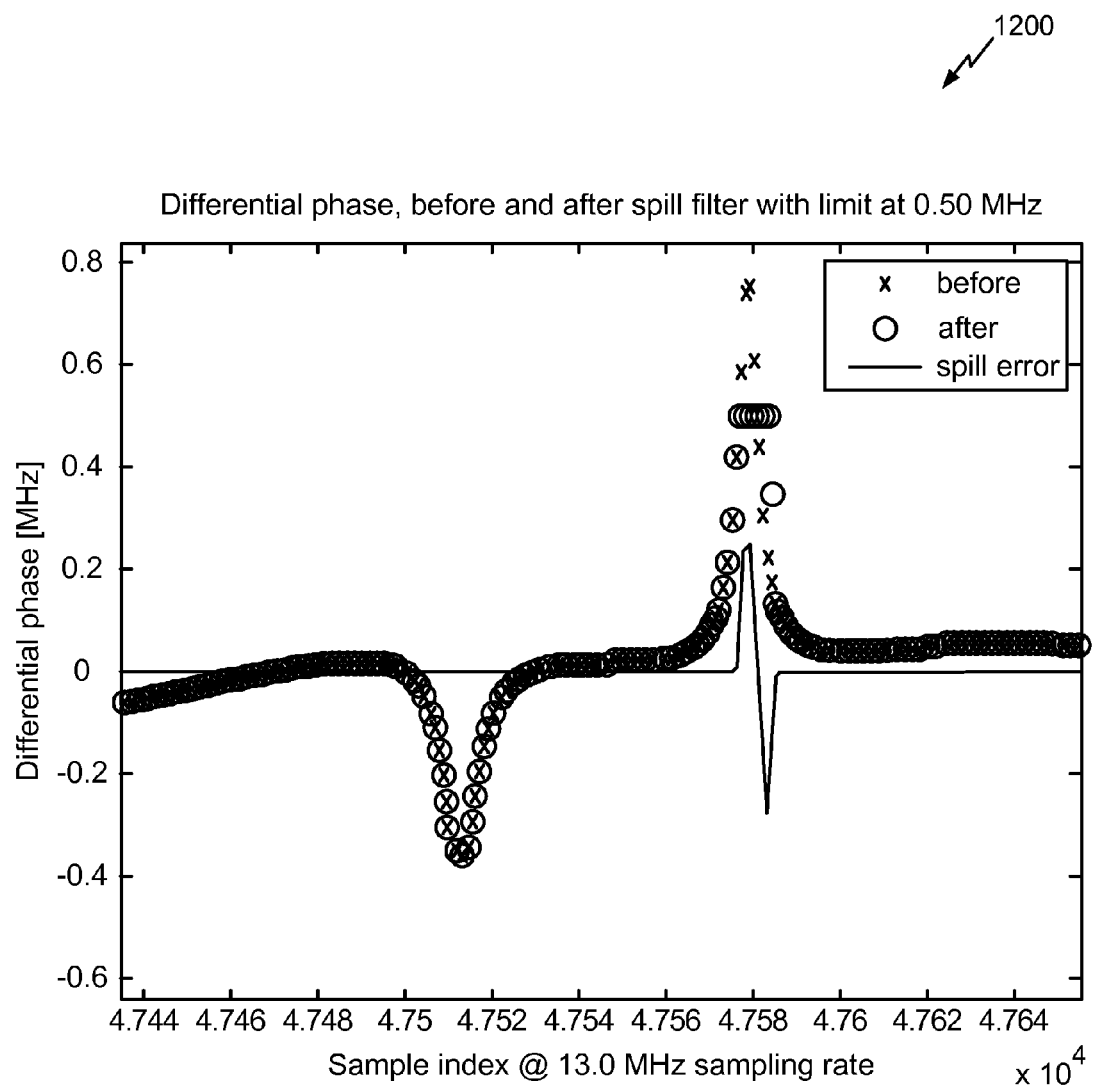
FIG. 12 is a plot of the frequency of the modified signal before and after the application of the CSF according to some embodiments of the present invention.

FIG. 12 is a plot 1200 of the frequency of the modified signal before and after the application of the CSF. Here it can be seen that once the input frequency exceeds the frequency limit, the CSF hard-limits the frequency to constrain it. Where the input frequencies are below the frequency limit, the CSF tracks the input frequencies as can be seen on the left side of plot 1200.

Figure 13:
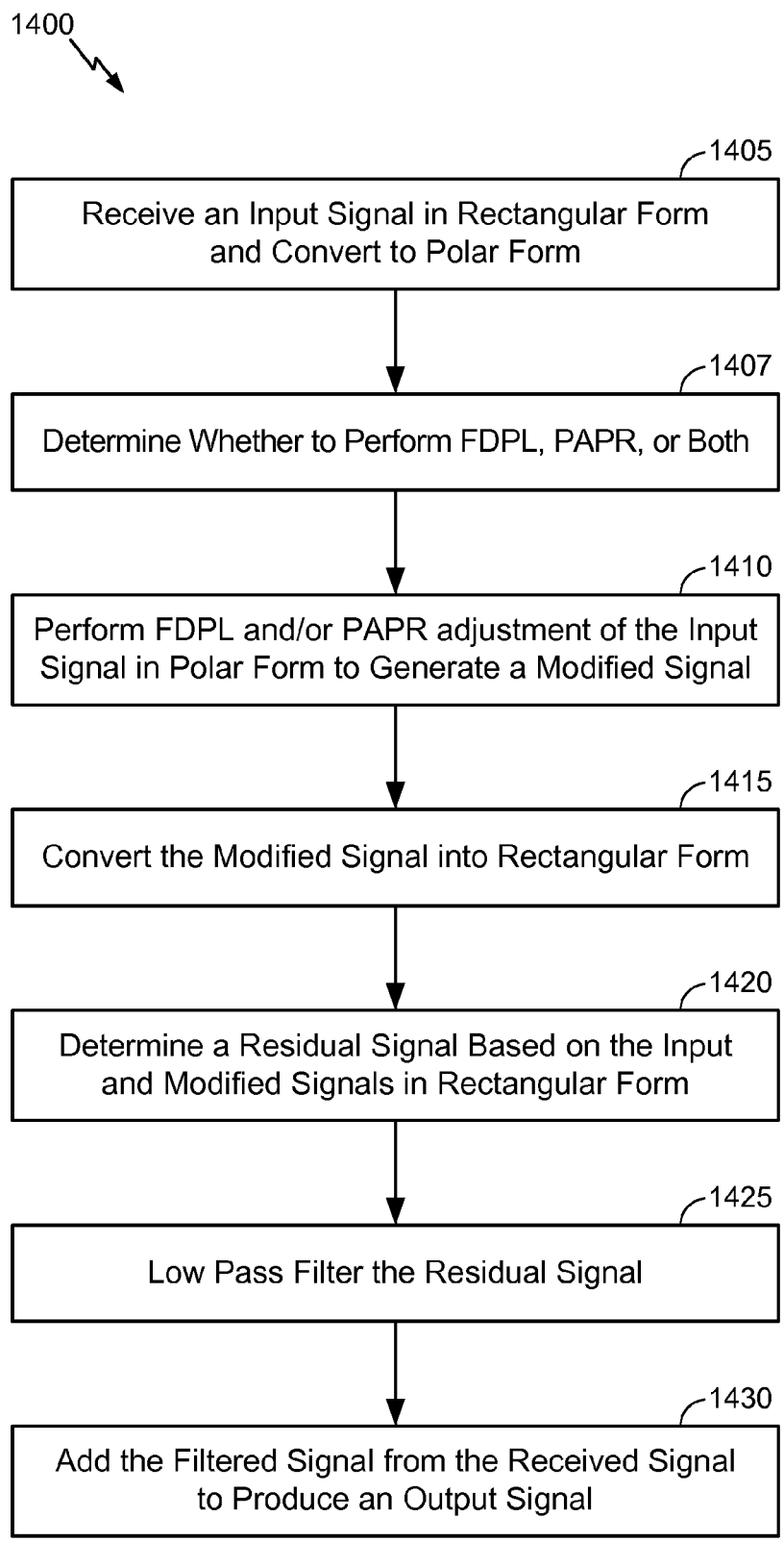
FIG. 13 is a flow chart illustrating a method for limiting the differential phase of an input signal according to some embodiments of the present invention.

FIG. 13 is a flow chart illustrating a method 1400 for limiting the differential phase and for PAPR reduction. The method may start by receiving an input signal in rectangular form and converting the input signal to polar form (Block 1405). This transformation may be performed by Rectangular-to-Polar converter 405. A determination may be performed as to whether the signal modification block 410 will perform FDPL processing, PAPR adjustment processing, or both (Block 1407). This determination may be done as discussed above. The differential phase of the input signal in polar form may be limited and/or the amplitude adjusted to generate a modified signal in polar form (Block 1410). The limiting (Block 1410) can be based on the determination (Block 1407). The FDPL may be performed by the signal modification module 410 using, for example, the RSF approach or the Viterbi-based approach. The PAPR may be performed by the signal modification module 410 using, for example the clipping approach provided above. The modified signal in polar form may be converted into rectangular form (Block 1415). This may be performed by the Polar-to-Rectangular converter 420. A residual signal may be determined based on the input and modified signals in rectangular form (Block 1420). The residual signal may then be low pass filtered using LPF 430 (Block 1425). The filtered signal residual signal may then be added from the received signal to produce an output signal having limited differential phase (Block 1430).

Figure 14:
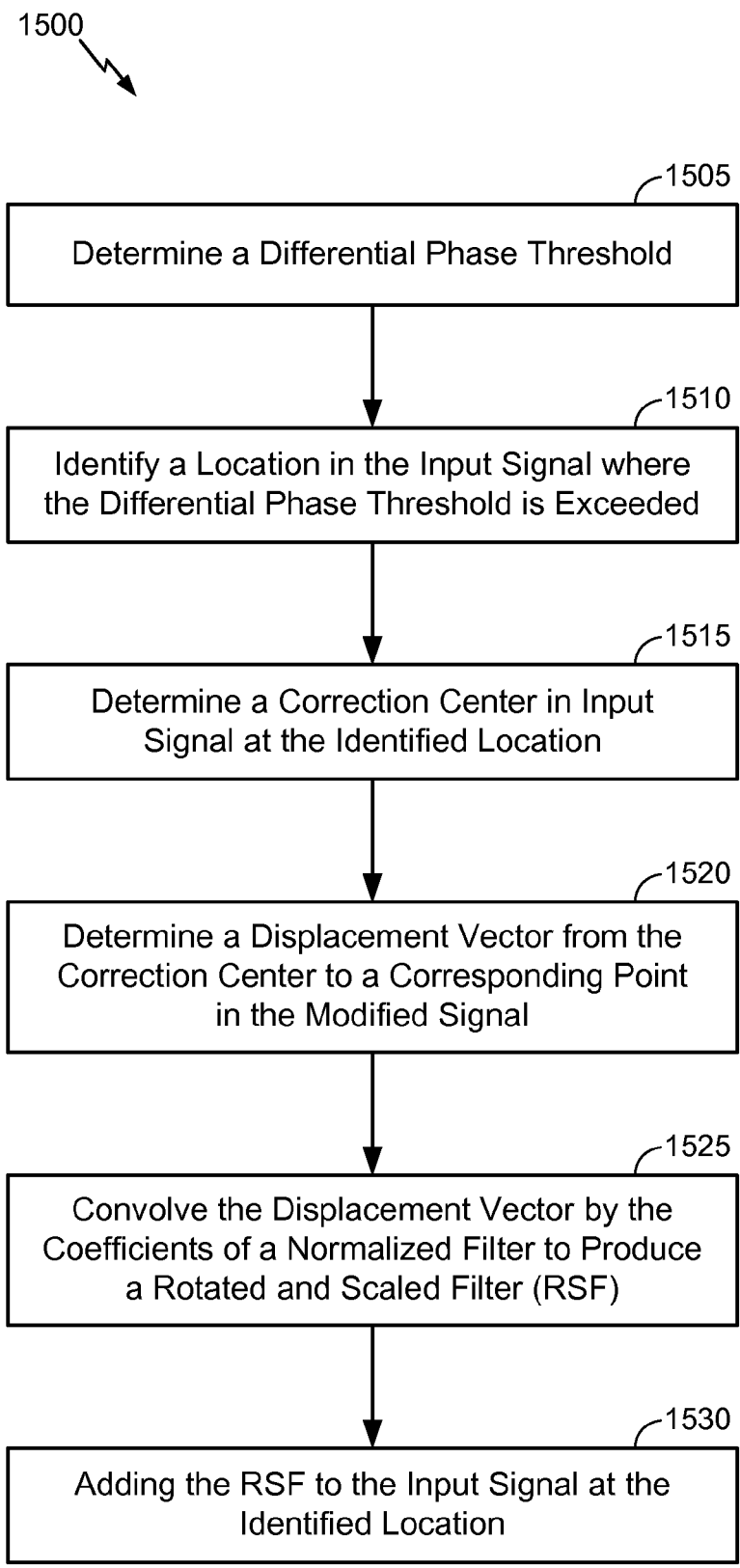
FIG. 14 is a flow chart illustrating a method for minimizing the differential phase using the RSF according to some embodiments of the present invention.

FIG. 14 is a flow chart illustrating a method 1500 for minimizing the differential phase using the Rotated and Scaled Filter (RSF). The method may initially determine a differential phase threshold (Block 1505). This threshold may be selected based upon the swing range of the VCO 335 in the polar transmitter. Next, the method can include identifying a location in the input signal where the differential phase threshold is exceeded (Block 1510). A correction center in input signal may be established at the identified location (Block 1515). A displacement vector may be determined from the correction center to a corresponding point in the modified signal (Block 1520). The method may convolve the displacement vector by the normalized filter to produce the RSF (Block 1525). The method may then add the RSF to the input signal at the identified location (Block 1530).

Figure 15:
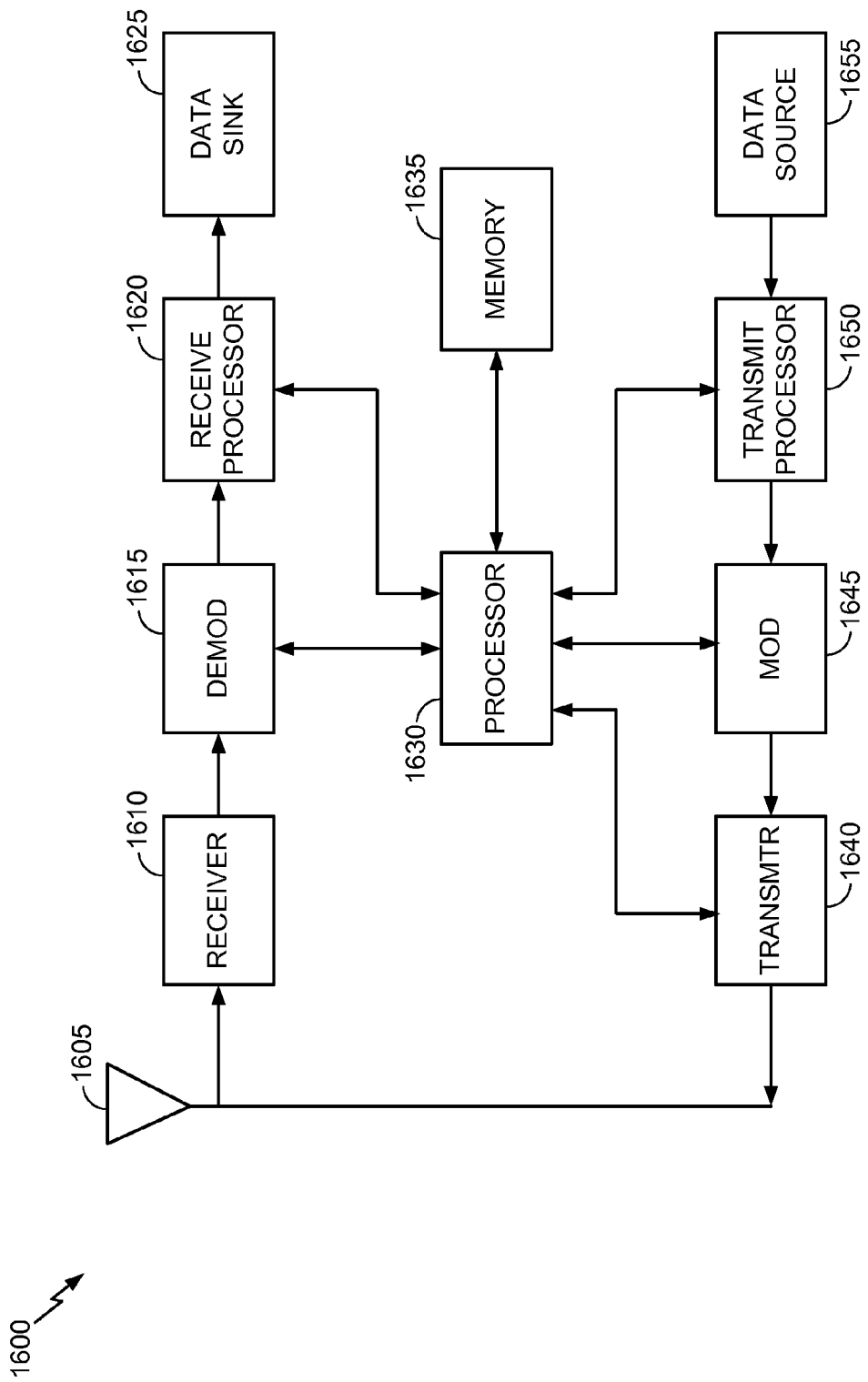
FIG. 15 is a block diagram of an exemplary mobile device which may perform FPDL and/or PAPR adjustment according to some embodiments of the present invention.

FIG. 15 is a block diagram of an exemplary mobile device 1600 which may perform FPDL and/or PAPR adjustment as discussed in this application. For the transmitting signal chain, the mobile device 1600 may include a data source 1655, a transmit processor 1650, a modulator 1645, a polar transmitter 1640, and an antenna 1605. The data source 1655 may supply data from a variety of sources generated by the mobile device (e.g., voice, video, data, sensor, etc.), and provide the data to a transmit processor 1650. The transmit processor 1650 may perform interleaving and/or coding (such as, for example, turbo coding and/or error correction coding). The transmit processor 1650 may further receive operational commands and/or information to be included with control channels from a processor 1630. The transmit processor 1650 may provide data to modulator 1645, which may transform the data to symbols as provided above in the description of modulator 305 shown in FIG. 3. The processor 1630 may provide commands to modulator 305 which may, for example, select what type of modulation to perform on the data. The modulated symbols may then be provided to the polar transmitter 1640. At this stage, the polar transmitter and the processor 1630 may exchange commands and data to perform the FPDL and/or PAPR methods as described above. In an embodiment, the processor 1630 may utilize data and/or instructions which may be stored in memory 1635 for performing the FPDL and/or PAPR methods. The polar transmitter 1640 may further process (e.g., filter, up-convert, etc.) and amplify the FPDL and/or PAPR processed signal, and subsequently provide the amplified signal to antenna 1605 for transmission.

For the receiving signal chain, mobile device 1600 may receive wireless signals at antenna 1605. The received signals may be processed (filtered, down-converted, etc.) and amplified by receiver 1610. The received signals may then be provided to demodulator 1615 to transform the modulated symbols to data. The type of demodulation may be set by command from processor 1630. The demodulated data may be further processed by receive processor 1620 to perform, for example, deinterleaving, decoding, etc.). The data may then be provided to data sink 1625 for subsequent use.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for signal conditioning for polar transmitters. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:

1. A method for conditioning a signal in a polar transmitter, comprising:

receiving an input signal having a rectangular form;

determining whether to limit differential phase and/or adjust a Peak to Average Power Ratio (PAPR) of the input signal;

converting the input signal having the rectangular form to an input signal having a polar form;

limiting a differential phase of the input signal having the polar form to generate a modified signal having a polar form, and/or adjusting the peak to average power ratio, based on the determining;
converting the modified signal having the polar form to a rectangular form signal;
determining a residual signal based at least in part on the input signal having the rectangular form and the modified signal having rectangular form;
filtering the residual signal to reduce high-frequency components to obtain a filtered signal; and
adding the filtered signal to the input signal having the rectangular form to produce an output signal with a limited differential phase and/or reduced PAPR.

2. The method according to claim 1, wherein limiting the differential phase further comprises:
determining parameters for a rotated and scaled filter (RSF);
selecting a location in the input signal to apply the RSF; and
adding the RSF to the input signal at the selected location.

3. The method according to claim 2, further comprising:
determining a differential phase threshold;
identifying a location in the input signal where the differential phase threshold is exceeded;
determining a correction center in the input signal at the identified location;
determining a displacement vector from the correction center to a corresponding point in the input signal; and
convolving the displacement vector by coefficients of a normalized filter to produce the RSF.

4. The method according to claim 2, further comprising:
determining two samples, corresponding to a first sampling frequency, in the input signal which are closest to an origin;
interpolating between the two samples to up-sample the input signal to a second frequency; and
identifying the interpolated sample closest to an equal-phase sample location; and
determining the parameters of the RSF using the identified interpolated sample of the input signal.

5. The method according to claim 1, wherein filtering the residual signal to reduce high-frequency components utilizes a boxcar low pass filter or a Kaiser low pass filter.

6. The method according to claim 5, wherein the boxcar low pass filter comprises a cascaded integrator and comb filter.

7. The method according to claim 1, further comprising: applying a causal spill filter to limit differential phase within the output signal.

8. The method according to claim 7, wherein the causal spill filter includes a one-pole IIR filter with a non-linear limiter.

9. The method according to claim 1, wherein minimizing the differential phase further comprises: minimizing the differential phase using at least one of a KKT or Viterbi-based algorithm.

10. The method according to claim 1, wherein adjusting PAPR of the input signal further comprises:
clipping an envelope of the input signal having the polar form to limit its magnitude below a threshold to generate a clipped signal having polar form;
converting the clipped signal having the polar form to a clipped signal having a rectangular form;
determining a residual signal based at least in part on the input signal having the rectangular form and the clipped signal having the rectangular form;
filtering the residual signal to reduce high-frequency component and adjusting gain thereof; and
adding the gain adjusted filtered signal to the received input signal having the rectangular form to produce an output signal with a reduced PAPR.

11. An apparatus comprising:
a processor; and
a memory having instructions that configure the processor to:
receive an input signal having a rectangular form;
determine whether to limit differential phase and/or adjust a Peak to Average Power Ratio (PAPR) of the input signal;
convert the input signal having the rectangular form to an input signal having a polar form;
limit a differential phase of the input signal having the polar form to generate a modified signal having a polar form, and/or adjusting the peak to average power ratio, based on the determining;
convert the modified signal having the polar form to a modified signal having a rectangular form;
determine residual signal based at least in part on the input signal having the rectangular form and the modified signal having the rectangular form;
filter the residual signal to reduce high-frequency components; and
add the filtered signal from the received input signal having the rectangular form to produce an output signal with a limited differential phase and/or reduced PAPR.

12. The apparatus of claim 11, wherein filtering the residual signal to reduce high-frequency components utilizes a boxcar low pass filter or a Kaiser low pass filter.

13. The apparatus of claim 12, wherein the boxcar low pass filter comprises a cascaded integrator and comb filter.

14. The apparatus of claim 11, wherein limiting the differential phase utilizes a causal spill filter that includes a one-pole IIR filter with a non-linear limiter.

15. A polar transmitter for use with a wireless communication device comprising:
a processor; and
a memory having instructions that configure the processor to:
convert data for transmission from a rectangular form to a polar form;
convert the polar form to a modified polar form based on at least one of frequency, differential phase, and peak to average power ratio processing;
generate a modified rectangular form based on the modified polar form; and
produce a limited differential phase output based on the rectangular form and the modified rectangular form, wherein producing the limited differential phase output comprises determining a difference between a delayed version of the rectangular form and the modified rectangular form.

16. The polar transmitter of claim 15, wherein the processor is a single stand alone processor that executes the instructions to produce the limited differential phase output based on the rectangular form and the modified rectangular form.

17. The polar transmitter of claim 15, wherein the processor produces the limited differential phase output using a Viterbi-based algorithm.

18. The polar transmitter of claim 15, further comprising at least one antenna configured to transmit data signals corresponding to the limited differential phase output.

19. The polar transmitter of claim 15, wherein the processor produces the limited differential phase using a causal spill that includes a one-pole IIR filter with a non-linear limiter.

20. An apparatus for use with a polar transmitter in a wireless communication device, comprising:
   a processor; and
   a memory having instructions that configure the processor to:
   convert data for transmission from a rectangular form to a polar form;
   convert the polar form to a modified polar form based on at least one of frequency, differential phase, and peak-to-average-power ratio processing;
   generate a modified rectangular form based on the modified polar form; and
   produce a limited differential phase output based on the rectangular form and the modified rectangular form, wherein producing the limited differential phase output comprises determining a difference between a delayed version of the rectangular form and the modified rectangular form.

* * * * *